(No Model.)

T. TAYLOR.
ROPE FASTENER.

No. 322,501. Patented July 21, 1885.

Witnesses:

Inventor:
Theodore Taylor
by R. J. Shadbolt
Atty.

UNITED STATES PATENT OFFICE.

THEODORE TAYLOR, OF MOUNT VERNON, NEW YORK.

ROPE-FASTENER.

SPECIFICATION forming part of Letters Patent No. 322,501, dated July 21, 1885.

Application filed May 15, 1885. (No model.)

*To all whom it may concern:*

Be it known that I, THEODORE TAYLOR, a citizen of the United States, residing at the village of Mount Vernon, in the county of Westchester and State of New York, have invented certain new and useful Improvements in Rope-Fasteners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to that class of fasteners in which the rope is held by friction in jaws of suitable formation. It is adapted to be used in various situations where it is desired to firmly secure a rope in place or to attach anything to a rope without knotting the latter.

The invention relates more particularly to the arrangement of the two eyes which cause the rope to make partial turns as it enters and leaves the jaws; to the formation of the jaws so that they grasp or hold the rope by friction when the latter is turned, as above mentioned, for a considerable portion of its length, and so distribute the strain upon it and prevent its breaking, and to the combination, with the above-mentioned jaws and eyes, of a third eye, by means of which the fastener may be held by a hook or other device.

My invention can best be understood by reference to the accompanying drawings, which illustrate a means for carrying it into effect.

Figure 1:
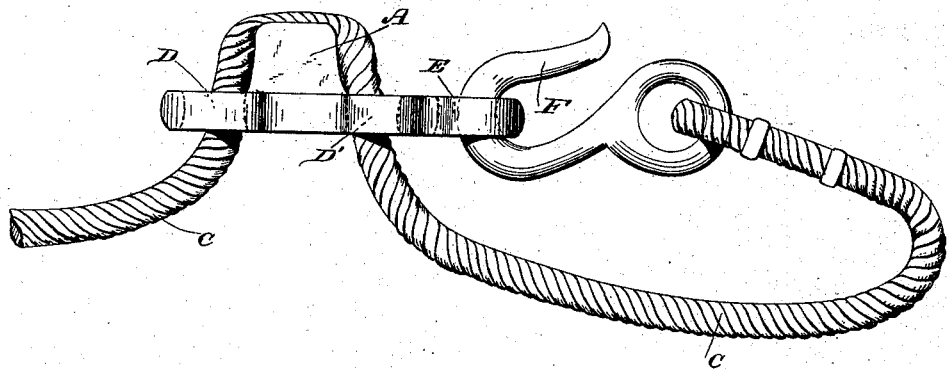
Figure 2:
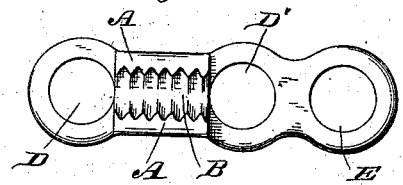
Figure 3:
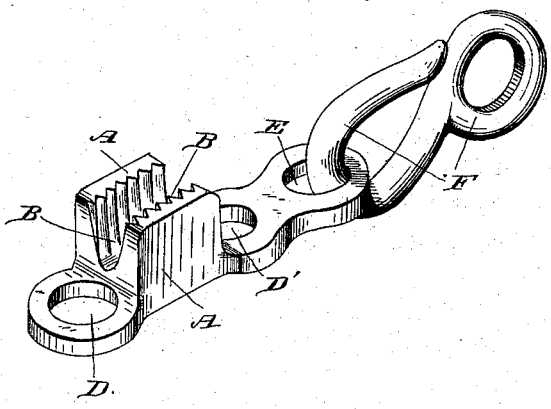

Figure 1 is a side view of a fastener embodying my invention, shown as applied to a rope. Fig. 2 is a plan view of the fastener. Fig. 3 is a perspective view of the same.

Referring to the drawings, A A represent two grasping or holding jaws arranged relative to one another to form an angular groove or channel, B, in which the rope C will become wedged and firmly held when proper direction is given to it. The means for the latter purpose consist of the rings or eyes D D', carried by the jaws A, and arranged substantially in line with the channel B. These eyes are also situated in a plane parallel to and lower than the channel B. At one end of the device there is formed a third eye, E, by which the fastener may be secured, as to a hook, F. When the rope C is attached at one end to the hook F, as shown, the device may be used to form a loop, G, in the rope of any desired size. This loop will remain of the size to which it is adjusted without slipping till the adjustment is intentionally changed.

The fastener may be formed in any desired and suitable way. The most convenient and best manner I deem to be to cast the jaws and eyes in a single piece of metal in the form shown in the drawings.

In using the device the rope to be secured is to be passed through one of the eyes D D', from the side opposite to the jaws A, then passed back through the eye at the other end of the jaws, the bight thus formed laid in the channel B, and then one or the other of the ends of the rope pulled till it lies snugly in the channel. The fastener will then maintain its position relative to the rope and support any pull to the extent of the strength of the latter.

What I claim, and desire to secure by Letters Patent of the United States, is—

1. In a rope-fastener, the combination of two holding-jaws and two rings or eyes situated one on each side of the jaws, whereby a rope may be caused to make a quarter-turn where it enters and also where it leaves the jaws, substantially as set forth.

2. In a rope-fastener, the combination of two transversely-corrugated holding-jaws adapted to engage a rope for a considerable portion of its length, and two rings or eyes situated one on each side of the jaws, whereby a rope may be caused to made a quarter-turn where it enters and also where it leaves the jaws, substantially as set forth.

3. In a rope-fastener, the combination of two holding-jaws, two rings or eyes situated one on each side of the jaws, whereby a rope may be caused to make a quarter-turn where it enters and also where it leaves said jaws, and a third eye whereby the device may be held by a hook or other fastening, substantially as set forth.

In testimony whereof I affix my signature in presence of two witnesses.

THEODORE TAYLOR.

Witnesses:
WILLIAM G. GROTECLOP,
FRANCIS F. KEELER.